July 21, 1959 R. J. ERISMAN 2,895,330
SWITCHING MEANS FOR STRAIN MEASURING APPARATUS
Filed Feb. 7, 1957
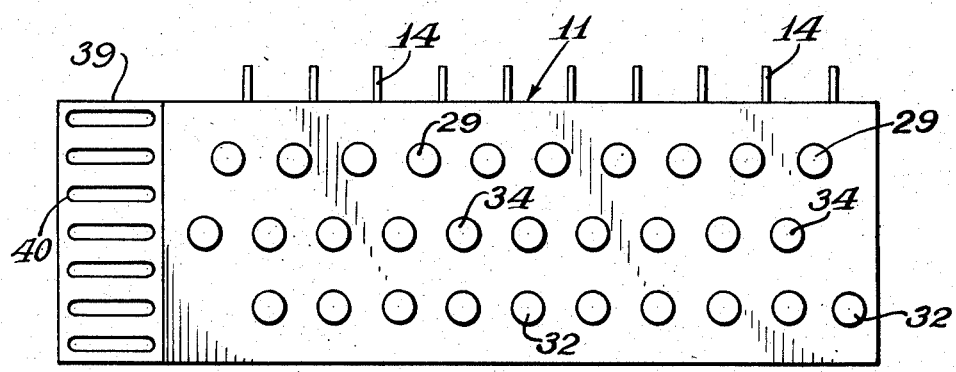
Fig.4.
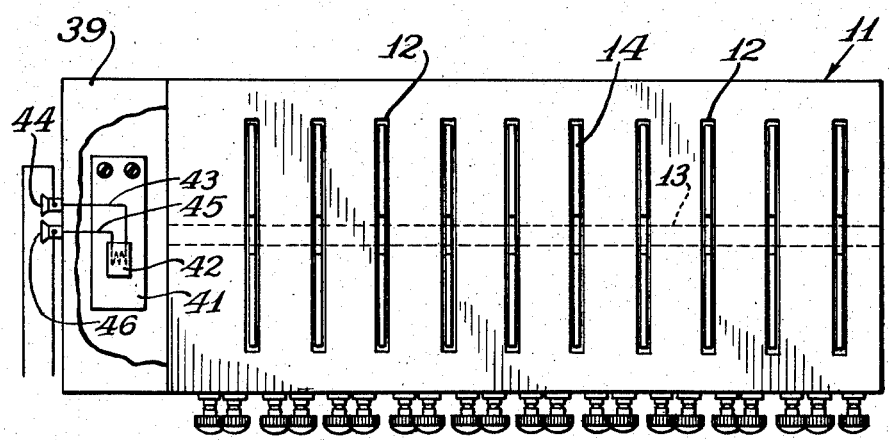
Fig.3.
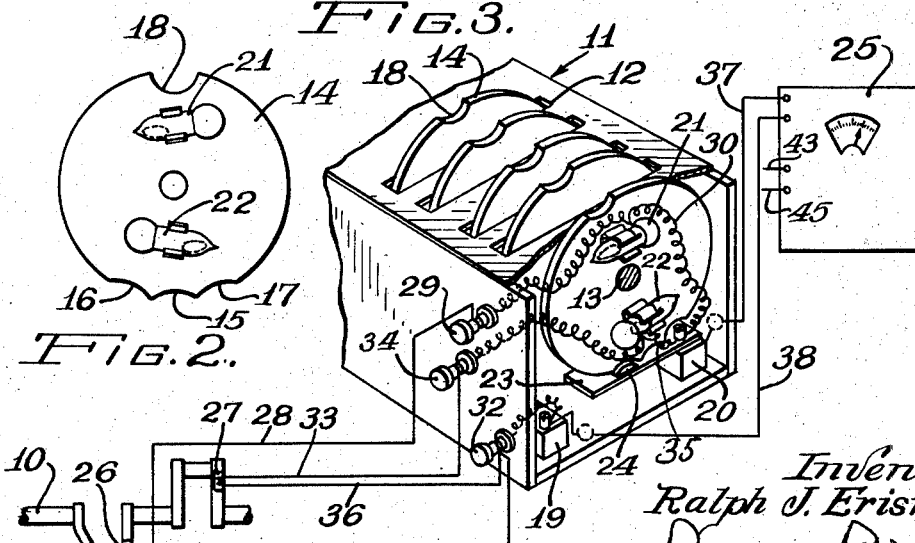
Fig.2.
Fig.1.
Inventor:
Ralph J. Erisman
Atty.

United States Patent Office 2,895,330
Patented July 21, 1959

2,895,330
SWITCHING MEANS FOR STRAIN MEASURING APPARATUS

Ralph J. Erisman, Oak Park, Ill., assignor to International Harvester Company, Chicago, Ill., a corporation of New Jersey Application February 7, 1957, Serial No. 638,712

4 Claims. (Cl. 73—88.5)

This invention relates to a strain measuring apparatus and is primarily concerned with a switching means for a strain measuring apparatus.

An object of the invention is to provide a means of rapidly switching individual strain measuring gages into the electric circuit.

Another object of the invention is to provide mercury switches on a switching means of a strain measuring apparatus so as to give constant resistance in the electric circuit.

The foregoing and other objects of the invention will be apparent from the construction and arrangement illustrated in the accompanying drawings wherein:

Figure 1 is a fragmentary perspective view of the disc containing box and diagrammatic views of a strain measuring apparatus and showing a portion of an engine crankshaft, Figure 2 is an elevational view of one of the discs with a pair of mercury switches being mounted thereon, Figure 3 is a top plan view of the disc containing box, and Figure 4 is a side elevational view of the disc containing box.

The invention proposes a switching means for strain measuring apparatus. The switching means is comprised of a box and a plurality of discs which are rotatably mounted in the box. Each disc carries a pair of mercury switches. A pair of bus bars are mounted in the box.

In use, a plurality of strain gages are secured to a test specimen at spaced locations so that the strain at these locations can be measured. A pair of gages are controlled by each disc. That is, one gage of a pair is electrically connected to one mercury switch on one disc and to the bus bars and the other of the pair of gages is electrically connected to the other mercury switch on the same disc and to the bus bars. A strain indicating instrument is electrically connected to the bus bars. Rotation of one disc in one direction will complete the circuit through one gage of a pair to measure the strain in the member at the location of the gage and rotation of the same disc in the opposite direction will complete the circuit through the other gage of the pair so that the strain in the member at the location of said other gage is measured. The disc is then moved to a circuit breaking position. The other discs are operated consecutively. When one disc is being operated the other discs are in a circuit breaking position. This switching means has the advantage of rapidly switching the individual gages into the circuit so that the strains at the locations of the gages on the test specimen can be quickly and easily measured. Another advantage is the obtainment of excellent reproducibility of the readings. In other types of switching units, the resistance of the contacting media may vary substantially due to changes in pressure and the possibility of dirt entry. Thus, the over-all resistance in the circuit may vary, giving erroneous strain indications. Since both of these sources of false readings are eliminated in a mercury switch, accurate data is assured.

In the drawings, 10 designates a crankshaft of an internal combustion engine. The crankshaft 10 is subjected to stresses at a large number of locations thereon and it is desired to measure the strain at each of these locations on the crankshaft. The switching apparatus used for measuring the strain is comprised of a nonmetallic box 11 having a plurality of spaced parallel slots 12 in the top thereof. A shaft 13 is arranged longitudinally of and is fixedly secured to the ends of the box. A plurality of discs 14 are arranged in spaced parallel relation and are rotatably mounted on the shaft 13 and project through the slots 12 in the box. Each of the discs 14 is provided with a middle notch 15 and a pair of outer notches 16 and 17 with the notches being adjacent each other and a finger receiving recess 18 is disposed diametrically opposite the middle notch. A pair of bus bars 19 and 20 are disposed in the box 11 longitudinally thereof and are secured to the bottom of the box and are arranged in spaced relation. A pair of mercury switches 21 and 22 are mounted on each disc 14. A plurality of resilient elements 23 equal in number to the number of discs 14 are provided and each element is disposed opposite its respective disc and has one end secured to the bus bar 20. An upset lug 24 is stamped in each of the elements 23.

A strain indicating instrument 25 containing a battery is provided. A pair of gages 26 and 27 for each disc 14 are provided and these gages are secured to the crankshaft 10 at spaced locations. Electrical connections between each pair of gages 26 and 27 and the respective disc 14 are provided and are comprised of a wire 28 connecting one lead of the gage 26 to a binding post 29 secured to the box and then to the mercury switch 21 and a wire 30 connecting the mercury switch to the bus bar 20 and a wire 31 connecting the other lead of gage 26 through a binding post 32 secured to the box to the bus bar 19. Similar electrical connections for gage 27 consist of a wire 33 connecting one lead of gage patch 27 through a binding post 34 to the mercury switch 22 and a wire 35 connecting the mercury switch to the bus bar 20 and a wire 36 connects the other end of the wire in the gage 27 through the binding post 32 to the bus bar 19. A wire 37 connects the bus bar 20 to the strain indicating instrument 25 and a wire 38 connects the bus bar 19 to the strain indicating instrument.

Provision is made for conveniently locating a temperature compensating strain gage in enclosure 39 which is fixedly secured to one end of the box and has opening holes therein. The openings 40 are provided in the enclosure 39 so that the temperature will remain equal to that of the test specimen 10. The strain gage 42 is mounted on material 41 having equivalent thermal coefficient with test crankshaft 10 and is connected to individual binding posts 44 and 46. The electrical circuit is completed by attaching single wires 43 and 45 to binding posts 44 and 46 to the respective binding posts of the strain indicator.

The mode of operation of the strain measuring apparatus is as follows: When the respective disc 14 has its lug 24 engaged in the middle notch 15 the circuit is broken. This is because the mercury in the switch 21 or 22 is not touching the contacts in the glass bulb of either mercury switch. When the operator's finger is placed in the recess 18 and the respective disc 14 rotated in a clockwise direction as viewed in Figure 1 until lug 24 is engaged in the outer notch 17 the circuit through the gage 26 will be completed. This is because the glass bulbs of the mercury switches 21 and 22 on the respective disc 14 are disposed in opposite directions with the contacts being in the remote ends of the glass bulbs so that when the mercury in switch 21 moves into engagement with the contacts in that switch the mercury in switch 22 will move away from the contacts in switch 22. When the operator moves the respective disc 14 in a counterclockwise direction as viewed in Figure 1 until lug 24 engages notch 16 the mercury in switch 22 will engage the contacts in that switch and the circuit through the gage 27 will be completed. Zero readings are taken first, that is, before any loads are placed on the crankshaft 10. This is done by moving each disc 14 so that the respective lug 24 engages notch 16 and then notch 17. The discs are moved consecutively so that when a circuit is completed through one disc the other discs are in a neutral position. After all the zero readings have been taken the crankshaft 10 is subjected to loads. The discs 14 are then moved consecutively so that the strain at each gage on the crankshaft is indicated on the strain indicating instrument 25.

In the drawings ten discs 14 have been shown in one box. The number of discs may be varied as desired. There are a set of wires and bending posts 28, 29, 30, 31, 32, 33, 34, 35 and 36 for each disc 14. There is only one wire 37 and one wire 38 for all ten discs 14. Since there are two gages for each disc there may be as many as twenty gages. Once the wiring from the twenty gages to the discs and from the bus bars to the strain indicating instrument has been connected up all ten discs may be consecutively operated without connecting any wiring or disconnecting any wiring. By connecting to the bus bars 19 and 20 in the box 11 extra boxes in series can be added. This will enable a greater number of gages to be used so that the strains at a greater number of locations on the member can be measured. The box 11 is preferably nonmetallic since a metallic box would cause the circuit to be grounded. The box can be made of plastic or Bakelite.

The claims for this invention are:

1. Means for measuring strain on a member subjected to loads at a plurality of locations on the member and a plurality of wire containing gages secured to the member at spaced locations and a strain indicating instrument, the means comprising a box, a plurality of discs supported by the box for rotative movement, a pair of bus bars disposed in the box and arranged in spaced relation, a pair of switches mounted on each disc, one pair of the wire containing gages being provided for each of the discs, electrical connections between each of the gages and one of the switches on the respective disc and the bus bars, and electrical connections leading from the bus bars to the strain indicating instrument, rotation of the respective disc in one direction causing engagement of one of the switches on the disc completing the circuit through one of the pair of gages so that the strain at the particular location on the member is indicated on the strain indicating instrument and rotation of the disc to a neutral position causing both switches on the disc to be disengaged breaking the circuit and rotation of the disc in the opposite direction causing engagement of the other of the switches on the disc completing the circuit through the other of the pair of gages so that the strain at the particular location on the member is indicated on the strain indicating instrument.

2. Means for measuring strain on a member subjected to loads at a plurality of locations on the member and a plurality of wire containing gages secured to the member at spaced locations and a strain indicating instrument, the means comprising a box, a plurality of discs supported by the box for rotative movement, a pair of bus bars disposed in the box and arranged in spaced relation, a pair of mercury switches mounted on each disc, one pair of the wire containing gages being provided for each of the discs, electrical connections between each of the gages and one of the mercury switches on the respective disc and the bus bars, and electrical connections leading from the bus bars to the strain indicating instrument, rotation of the respective disc in one direction causing engagement of one of the mercury switches on the disc completing the circuit through one of the pair of gages so that the strain at the particular location on the member is indicated on the strain indicating instrument and rotation of the disc to a neutral position causing both mercury switches on the disc to be disengaged breaking the circuit and rotation of the disc in the opposite direction causing engagement of the other of the mercury switches on the disc completing the circuit through the other of the pair of gages so that the strain at the particular location on the member is indicated on the strain indicating instrument.

3. Means for measuring strain on a member subjected to loads at a large number of locations on the member and a plurality of wire containing gages secured to the member at spaced locations and a strain indicating instrument, the means comprising a box, a plurality of discs mounted in the box for rotative movement, a pair of bus bars disposed in the box and arranged in spaced relation, a pair of switches mounted on each disc, means disposed in the box opposite each disc and engaging the respective disc to hold it in a neutral position and to hold it after it has been rotated in one direction and to hold it after it has been rotated in the opposite direction, one pair of the wire containing gages being provided for each of the discs, electrical connections between each of the gages and one of the switches on the respective disc and the bus bars, a first wire leading from one of the bus bars to the strain indicating instrument, and a second wire leading from the other of the bus bars to the strain indicating instrument, rotation of the respective disc in one direction causing engagement of one of the switches on the disc completing the circuit through one of the pair of gages so that the strain at the particular location on the member is indicated on the strain indicating instrument and rotation of the disc to the neutral position causing both switches on the disc to be disengaged breaking the circuit and rotation of the disc in the opposite direction causing engagement of the other of the switches on the disc completing the circuit through the other of the pair of gages so that the strain at the particular location on the member is indicated on the strain indicating instrument.

4. Means for measuring strain on a member subjected to loads at a large number of locations on the member and a plurality of wire containing gages secured to spaced locations on the member and a strain indicating instrument, the means comprising a nonmetallic box, a shaft arranged longitudinally of and fixedly secured to the box, a plurality of discs arranged in spaced parallel relation and rotatably mounted on the shaft, each of the discs being provided with a middle notch and a pair of outer notches adjacent each other, a pair of bus bars disposed in the box longitudinally thereof and arranged in spaced relation, a pair of mercury switches mounted on each disc, a plurality of resilient elements equal in number to the number of discs and each of the elements having one end secured to one of the bus bars and disposed opposite the respective one of the discs, a lug fixedly secured to each of the elements, one pair of the wire containing gages being provided for each of the discs, electrical connections between each pair of gages and the respective disc comprising a first wire leading from one of the pair of gages to one of the mercury switches and a second wire leading from said one of the switches to said one of the bus bars and a third wire leading from said one of the pair of gages to the other of the bus bars and a fourth wire leading from the other of the pair of gages to the other of the mercury switches and a fifth wire leading from said other of the mercury switches to said one of the bus bars and a sixth wire leading from said other of the pair of gages to said other of the bus bars, a seventh wire leading from said one of the bus bars to the strain indicating instrument, and an eighth wire leading from said other of the bus bars to the strain indicating instrument, engagement of the respective lug in one of the outer notches of its discs completing the circuit through said one of the pair of gages so that the strain on the member is indicated on the strain indicating instrument and engagement of the lug in the other of the outer notches of the same disc completing the circuit through said other of the pair of gages so that the strain on the member is indicated on the strain indicating instrument and engagement of the lug in the middle notch breaking the circuit.

References Cited in the file of this patent

UNITED STATES PATENTS

| | | |
|---|---|---|
| 1,945,635 | Greenewalt | Feb. 6, 1934 |
| 2,672,048 | Ruge | Mar. 16, 1954 |
| 2,734,107 | Reichel | Feb. 7, 1956 |
| 2,739,272 | Norden | Mar. 20, 1956 |
| 2,744,181 | Rea | May 1, 1956 |